US010752248B2

(12) United States Patent
Spoerl et al.

(10) Patent No.: US 10,752,248 B2
(45) Date of Patent: Aug. 25, 2020

(54) METHOD AND CONTROL DEVICE FOR OPERATING A MOTOR VEHICLE

(71) Applicant: ZF Friedrichshafen AG, Friedrichshafen (DE)

(72) Inventors: Peter Spoerl, Ravensburg (DE); Johannes Kemler, Ravensburg (DE); Franz-Josef Schuler, Kressbronn (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 181 days.

(21) Appl. No.: 15/771,159

(22) PCT Filed: Oct. 4, 2016

(86) PCT No.: PCT/EP2016/073607
§ 371 (c)(1),
(2) Date: Apr. 26, 2018

(87) PCT Pub. No.: WO2017/071913
PCT Pub. Date: May 4, 2017

(65) Prior Publication Data
US 2018/0354516 A1 Dec. 13, 2018

(30) Foreign Application Priority Data
Oct. 27, 2015 (DE) .......... 10 2015 220 999

(51) Int. Cl.
*F16H 61/02* (2006.01)
*B60W 30/18* (2012.01)
(Continued)

(52) U.S. Cl.
CPC ...... *B60W 30/18072* (2013.01); *B60W 10/06* (2013.01); *B60W 10/11* (2013.01);
(Continued)

(58) Field of Classification Search
CPC ................ B60W 10/06; B60W 10/11; B60W 30/18072; B60W 30/19;
(Continued)

(56) References Cited

U.S. PATENT DOCUMENTS 6,254,510 B1* 7/2001 Rauch ................. B60W 10/06
477/132
8,652,004 B2 2/2014 Herbeth et al.
(Continued)

FOREIGN PATENT DOCUMENTS

DE 102007012875 A1 9/2008
DE 102010052385 A1 6/2011
(Continued)

OTHER PUBLICATIONS

German Search Report DE102015220999.7 dated Sep. 12, 2016. (10 pages).
(Continued)

*Primary Examiner* — Edwin A Young
(74) *Attorney, Agent, or Firm* — Dority & Manning, P.A.

(57) ABSTRACT

A method for operating a motor vehicle, the motor vehicle including a prime mover (1), a transmission (2), and a driven end (3), wherein the transmission (2) is an automatic or automated transmission and is connected between the prime mover (1) and the driven end (3). The method includes activating a sailing mode of the motor vehicle depending on at least one operating condition of the motor vehicle; performing a gear select interlock in the transmission (2), while maintaining the sailing mode, when the sailing mode is active; and deactivating the sailing mode is subsequently depending on at least one operating condition of the motor vehicle. The gear select interlock is implemented in the transmission (2) depending on a rotational speed of the
(Continued)

prime mover (1) and depending on synchronous speeds of the gears of the transmission (2).

12 Claims, 2 Drawing Sheets

(51) Int. Cl.
*B60W 10/11* (2012.01)
*B60W 10/06* (2006.01)
*B60W 30/19* (2012.01)
*F16H 61/16* (2006.01)
*F16H 59/46* (2006.01)
*F16H 59/48* (2006.01)
*F16H 59/70* (2006.01)
*F16H 59/36* (2006.01)

(52) U.S. Cl.
CPC ......... *B60W 30/19* (2013.01); *F16H 61/0213* (2013.01); *F16H 61/16* (2013.01); *B60W 2030/1809* (2013.01); *B60W 2510/0638* (2013.01); *B60W 2510/0647* (2013.01); *B60W 2510/0652* (2013.01); *B60W 2710/1005* (2013.01); *F16H 59/46* (2013.01); *F16H 59/48* (2013.01); *F16H 59/70* (2013.01); *F16H 2059/366* (2013.01); *F16H 2059/462* (2013.01); *F16H 2061/0234* (2013.01); *F16H 2061/163* (2013.01); *Y02T 10/76* (2013.01)

(58) Field of Classification Search
CPC . B60W 2030/1809; B60W 2510/0638; B60W 2510/0647; B60W 2510/0652; F16H 61/0213; F16H 61/16; F16H 2061/163
See application file for complete search history.

(56) References Cited

U.S. PATENT DOCUMENTS

| | | | |
|---|---|---|---|
| 9,656,670 B2 | 5/2017 | Mitsuyasu et al. | |
| 2006/0167610 A1* | 7/2006 | Reinards | F16H 61/0213 701/56 |
| 2010/0151991 A1 | 6/2010 | Mair et al. | |
| 2011/0313631 A1 | 12/2011 | Roth | |
| 2012/0029776 A1* | 2/2012 | Staudinger | F16H 61/0213 701/55 |
| 2013/0035830 A1 | 2/2013 | Finizio et al. | |
| 2015/0119196 A1 | 4/2015 | Schiergl | |

FOREIGN PATENT DOCUMENTS

| | | |
|---|---|---|
| DE | 102010000857 A1 | 7/2011 |
| DE | 102010024045 A1 | 12/2011 |
| DE | 102011005284 A1 | 9/2012 |
| DE | 102011005320 A1 | 9/2012 |
| DE | 102012008632 A1 | 10/2013 |
| DE | 102013219007 A1 | 3/2015 |
| DE | 112012007067 T5 | 8/2015 |
| EP | 2554448 A1 | 2/2013 |

OTHER PUBLICATIONS

International Search Report (English Translation) PCT/EP2016/073607, dated Dec. 21, 2016. (3 pages).

* cited by examiner

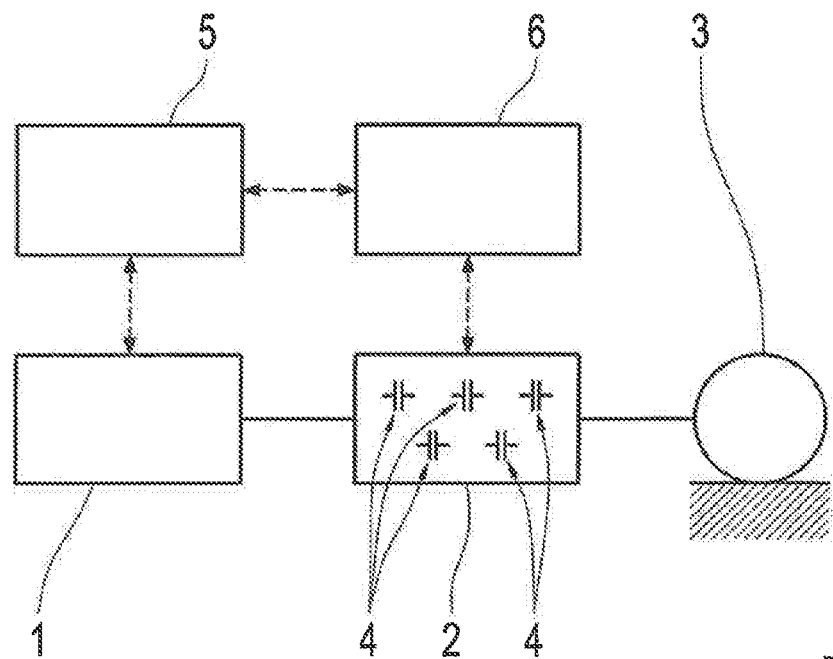
Fig. 1
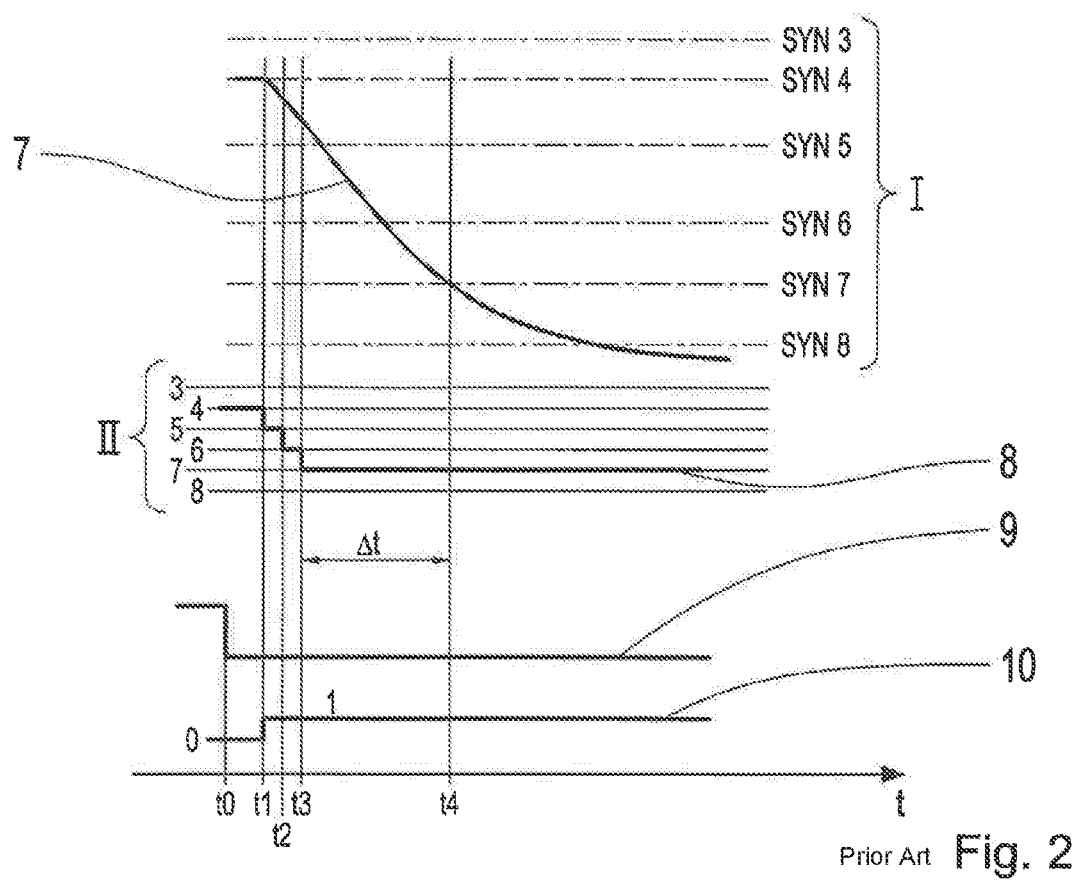
Prior Art  Fig. 2

METHOD AND CONTROL DEVICE FOR OPERATING A MOTOR VEHICLE

FIELD OF THE INVENTION

The invention relates generally to a method for operating a motor vehicle and to a control device for implementing the method.

BACKGROUND

DE 10 2011 005 320 A1 describes a method for operating a motor vehicle which includes a prime mover, a transmission, and a driven end, wherein the transmission is connected between the prime mover and the driven end. The transmission is an automatic or automated transmission. According to DE 10 2011 005 320 A1, a sailing mode for the motor vehicle is activated depending on at least one operating condition of the motor vehicle and, subsequently thereto, the sailing mode is deactivated depending on at least one operating condition of the motor vehicle. A sailing mode is understood to be an operating mode of the motor vehicle, in which the transmission of tractive force is interrupted in the transmission toward the driven end during operation while the prime mover is running or is idle. In the sailing mode, the prime mover is therefore decoupled from the driven end.

According to DE 10 2011 005 320 A1, the sailing mode is activated, while the motor vehicle is traveling with the internal combustion engine running and coupled to the driven end, when a driver-input torque depending on an actuation of the accelerator pedal by the driver or a traction torque specified by a driver assistance system lies in a defined range for a defined time and when, in addition, the current acceleration or deceleration of the motor vehicle lies in a defined range. Furthermore, DE 10 2011 005 320 A1 discloses various conditions for deactivating a previously activated sailing mode.

DE 10 2010 000 857 A1 describes yet another method for operating a motor vehicle. Disclosed in this prior art are details of a shift sequence for a gear disengagement during travel and details of a shift sequence for a gear engagement for exiting a sailing mode.

Although methods are already known from the prior art, with the aid of which it is possible to enter a sailing operating mode in a defined manner and, on the other hand, to exit the sailing operating mode in a defined manner, there is a need to improve the operation of the motor vehicle in the sailing mode, in particular in such a way that long waiting times and, optionally, an uncomfortable gear disengagement when exiting the sailing mode are avoided.

SUMMARY OF THE INVENTION

The object of the present invention is to provide a method for operating a motor vehicle and a control device for operating a motor vehicle.

According to the invention, when the sailing mode is active, the gear select interlock is implemented in the transmission depending on a rotational speed of the prime mover and depending on synchronous speeds of the gears of the transmission, while maintaining the sailing mode. In order to be able to quickly and comfortably engage a gear when exiting or deactivating a sailing mode, a defined gear select interlock in the transmission during the active sailing mode is proposed according to the invention, wherein this gear select interlock is implemented, according to the invention, depending on the rotational speed of the prime mover and further depending on synchronous speeds of the gears of the transmission. This allows for a rapid and comfortable gear engagement during deactivation of the sailing mode and, therefore, a rapid and comfortable coupling of the internal combustion engine to the driven end.

According to a first embodiment of the invention, the gear select interlock is implemented in the transmission at least depending on a rotational speed of the prime mover and depending on the synchronous speed of the next higher sailing gear of the transmission with respect to the particular current sailing gear of the transmission. When the gear select interlock is implemented depending on the synchronous speed of the next higher sailing gear of the transmission with respect to the particular current sailing gear of the transmission, the gear select interlock can take place particularly advantageously, in order to allow for a rapid and comfortable gear engagement in conjunction with the deactivation of the sailing mode.

According to a first variant of the first embodiment of the invention, the gear select interlock takes place in the transmission such that a shift from the current sailing gear into the next higher sailing gear of the transmission is implemented when the rotational speed of the prime mover falls below or reaches the synchronous speed of the next higher sailing gear of the transmission with respect to the particular current sailing gear of the transmission. This first variant is simple in terms of control and allows for a rapid and comfortable gear engagement and, therefore, coupling of the prime mover to the driven end when exiting the sailing mode.

According to a second variant of the first embodiment of the invention, the gear select interlock is also implemented in the transmission depending on a slowing gradient or a spin-down gradient of the rotational speed of the prime mover. Namely, an actual time is determined depending on the slowing gradient of the rotational speed of the prime mover, in which the rotational speed of the prime mover falls below or reaches the next higher sailing gear of the transmission with respect to the particular current sailing gear of the transmission, and a shift from the current sailing gear into the next higher sailing gear of the transmission is implemented when this actual time is less than a predefined, applicable target time. In this second variant, the gear select interlock takes place additionally depending on the slowing gradient of the rotational speed of the prime mover. As a result, the gear engagement and, therefore, the coupling of the prime mover to the driven end upon termination of the sailing mode can be further improved.

According to a third variant of the first embodiment of the invention, the gear select interlock is also implemented in the transmission depending on the synchronous speed of the particular current sailing gear of the transmission and depending on a run-up gradient of the rotational speed of the prime mover. Namely, a first actual time is determined depending on the slowing gradient of the rotational speed of the prime mover, in which the rotational speed of the prime mover falls below or reaches the synchronous speed of the next higher sailing gear of the transmission with respect to the particular current sailing gear of the transmission, and a second actual time is determined depending on the run-up gradient of the rotational speed of the prime mover, in which the rotational speed of the prime mover exceeds or reaches the synchronous speed of the particular current sailing gear of the transmission. A shift from the current sailing gear into the next higher sailing gear of the transmission is implemented when the first actual time becomes less than or becomes equal to the second actual time. The gear engagement and, therefore, the coupling of the prime mover to the driven end upon termination of the sailing mode can be further improved with this third variant as well.

According to a second embodiment of the invention, the gear select interlock is implemented in the transmission at least depending on the synchronous speed of the particular current sailing gear of the transmission. Namely, a shift from the current sailing gear into the next higher sailing gear of the transmission is implemented when the rotational speed of the prime mover falls below or reaches the synchronous speed of the current sailing gear of the transmission. With this second embodiment of the invention as well, the prime mover can be rapidly and comfortably coupled to the driven end when exiting or activating the sailing mode.

BRIEF DESCRIPTION OF THE DRAWINGS

Preferred embodiments will become apparent from the dependent claims and the description which follows. Embodiments of the invention are explained in greater detail with reference to the drawings, without being limited thereto. Components that are the same or similar are labeled using the same reference characters. In the drawings, the following is shown:

FIG. 1 shows a diagram of a drive train of a motor vehicle;

FIG. 2 shows a timing chart by way of an illustration of the method for operating a motor vehicle in the sailing mode, which is known from practical experience;

DETAILED DESCRIPTION

Figure 3:
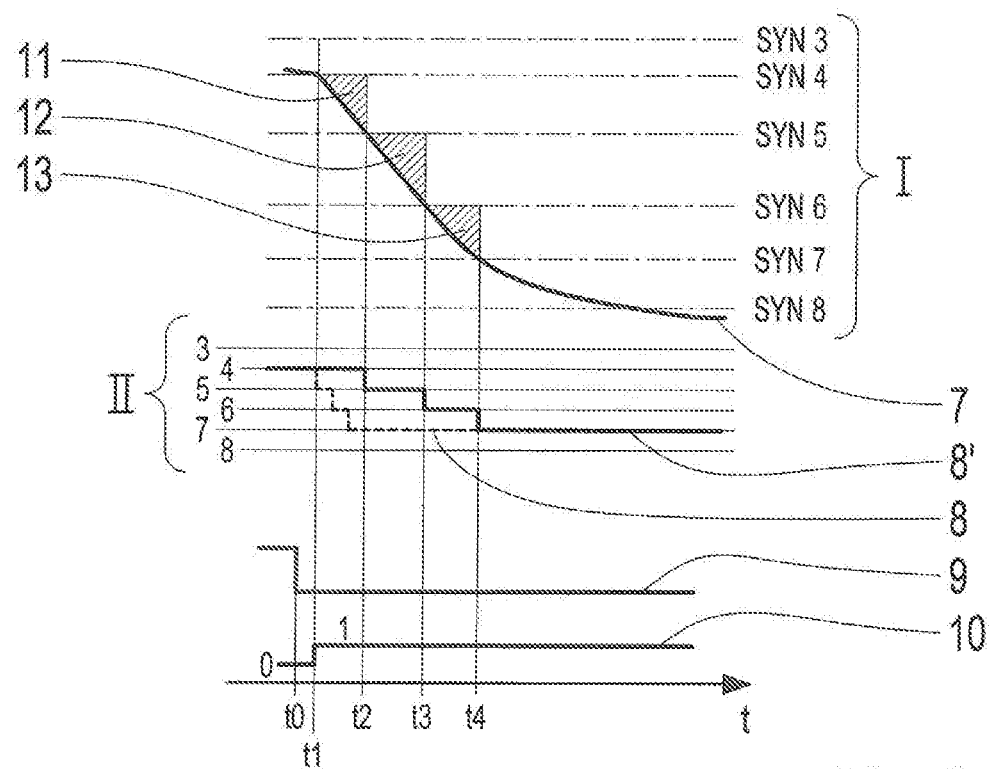
FIG. 3 shows a first timing chart by way of an illustration of the method for operating a motor vehicle in the sailing mode according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The invention relates to a method and to a control device for operating a motor vehicle.

FIG. 1 shows a diagram of a drive train of a motor vehicle including a motor or prime mover 1, a transmission 2, and a driven end 3, wherein the transmission 2 is connected between the prime mover 1 and the driven end 3.

The transmission 2 is an automatic or automated transmission and includes multiple shift elements 4 which can be friction-locking shift elements and/or form-fit shift elements.

Furthermore, FIG. 1 shows an engine control device 5 for controlling and/or regulating the operation of the prime mover 1 and a transmission control device 6 for controlling and/or regulating the operation of the transmission 2. The engine control device 5 exchanges data with the prime mover 1 and the transmission control device 6 exchanges data with the transmission 2. Furthermore, the engine control device 5 and the transmission control device 6 exchange data with each other.

As described above, the transmission 2 is an automated or automatic transmission including multiple shift elements 4. In each engaged gear of the transmission 2, a first number of the shift elements 4 is engaged and a second number of the shift elements 4 is disengaged.

In one specific exemplary embodiment of a transmission 2 including a number of five shift elements, it can be provided that three of the five shift elements are engaged and two of the five shift elements are disengaged in each engaged gear of the transmission. In the case in which more than two shift elements are disengaged, the transmission of tractive force, proceeding from the prime mover 1 in the direction of the driven end 3, is interrupted, and therefore the prime mover 1 is decoupled from the driven end 3.

When a motor vehicle is traveling with the prime mover 1 coupled to the driven end 3 and, therefore, a gear is engaged in the transmission 2, a sailing mode for the motor vehicle can be activated depending on at least one operating condition of the motor vehicle.

In the sailing mode, the prime mover 1 is decoupled from the driven end 3 while the prime mover is running, namely by disengaging one of the previously engaged shift elements 4 of the transmission 2.

In the aforementioned exemplary embodiment of a transmission 2 including five shift elements, in which three shift elements are engaged and two shift elements are disengaged in each engaged gear, this means that preferably three shift elements are disengaged and only two shift elements are engaged in the sailing mode. Such a gear, in which the motor vehicle sails while the prime mover 1 is decoupled from the driven end 3 by way of one shift element 4 of the transmission 2 too few being engaged, is referred to as a sailing gear.

It is already known from practical experience, as shown in FIG. 2, to implement a gear select interlock in the transmission 2 after the motor vehicle enters a sailing mode, namely while maintaining the sailing mode.

Multiple signal curves over the time t are shown in FIG. 2, namely a time sequence of a rotational speed 7 of the prime mover 1, a time sequence 8 of a sailing gear currently engaged in the transmission 2 when the sailing mode is active and, by way of a signal curve 9, an accelerator pedal actuation and, by way of a signal curve 10, a status signal indicating an active or inactive sailing mode.

In FIG. 2, the actuation of the accelerator pedal by the driver changes at the time t0 according to the signal curve 9, and, such that, proceeding from an accelerator pedal actuated before the time t0, the accelerator pedal is no longer actuated by the driver beginning at the time t0. Depending on this actuation of the accelerator pedal by the driver and preferably depending on at least one further operating condition of the motor vehicle, a sailing mode for the motor vehicle is subsequently automatically activated on the control side at the time t1 according to the signal curve 10, wherein it is clear from the signal curve 8 in FIG. 2 that the fourth gear is engaged in the transmission 2 before the time t1 and, therefore, also before the time t0. In FIG. 2, synchronous speeds I of the gears 3 to 8, which are marked as II, are shown as SYN3 to SYN 8.

When the sailing mode is activated at the time t1 according to FIG. 2, in particular by way of the running prime mover 1 being decoupled from the driven end 3 by disengaging yet another shift element 4 in the transmission 2, the previously friction-locking gear 4 becomes the sailing gear. In such a sailing gear, in which the motor vehicle sails while the running prime mover 1 is decoupled from the driven end 3, preferably one shift element too few for establishing the force-fit connection in the transmission 2 is engaged.

When the sailing mode is active, a gear select interlock takes place in the transmission 2 according to the signal curve 8, namely such that an upshift from the sailing gear 4 into the sailing gear 7 is implemented in the transmission 2, step by step, immediately at the points in time t1, t2 and t3, and while maintaining the sailing mode. In this case, the tractive force from the prime mover 1 toward the driven end 3 is interrupted, and therefore the rotational speed 7 of the prime mover 1 freely slows down or spins down.

It is clear from FIG. 2 that the rotational speed 7 of the prime mover 1 first reaches the synchronous speed SYN7 of the gear 7 at the time t4. According to practical experience and according to the prior art, the interval Δt therefore passes between the times t3 and t4, in which the gear 7 is already engaged in the transmission 2 as the sailing gear, but the prime mover 1 first reaches the rotational speed 7 that corresponds to the synchronous speed SYN7 of the seventh gear when this interval Δt expires at the time t4. As a result, when the sailing mode is to be terminated before the time t4 due to at least one operating condition of the motor vehicle, either a relatively long time elapses before the synchronous speed appropriate for the engaged sailing gear is reached, or the gear engagement in the transmission 2 must take place in an uncomfortable manner.

The present invention now relates to such details of a gear select interlock in the transmission 2 while the sailing mode of the motor vehicle is active, with the aid of which a more rapid and comfortable engagement of the tractive force and, therefore, a more rapid and comfortable coupling of the prime mover 1 to the driven end 3 is possible when the sailing mode is to be terminated.

According to the invention, the gear select interlock takes place in the transmission 2, when the sailing mode is active in the transmission 2, depending on the rotational speed of the prime mover 1 and depending on synchronous speeds of the gears of the transmission 2. The synchronous speed of the particular current sailing gear of the transmission 2 and/or the synchronous speed of the next higher sailing gear of the transmission 2 with respect to the particular current sailing gear of the transmission 2 can be taken into account as the synchronous speeds of the gears of the transmission 2, depending on which the gear select interlock is implemented in the transmission 2.

According to a first advantageous embodiment of the invention, the gear select interlock is implemented in the transmission 2, when the sailing mode is active, depending on the rotational speed of the prime mover 1 and, in addition, at least depending on the synchronous speed of the next higher sailing gear of the transmission 2 with respect to the particular current sailing gear of the transmission 2.

In this case, it is provided according to a first variant of this first embodiment of the invention that the gear select interlock takes place in the transmission 2, when the sailing mode is active, such that a shift from the current sailing gear into the next higher sailing gear of the transmission 2 is implemented when the rotational speed of the prime mover falls below or reaches the synchronous speed of the next higher sailing gear of the transmission 2 with respect to the particular current sailing gear of the transmission 2.

Figure 4:
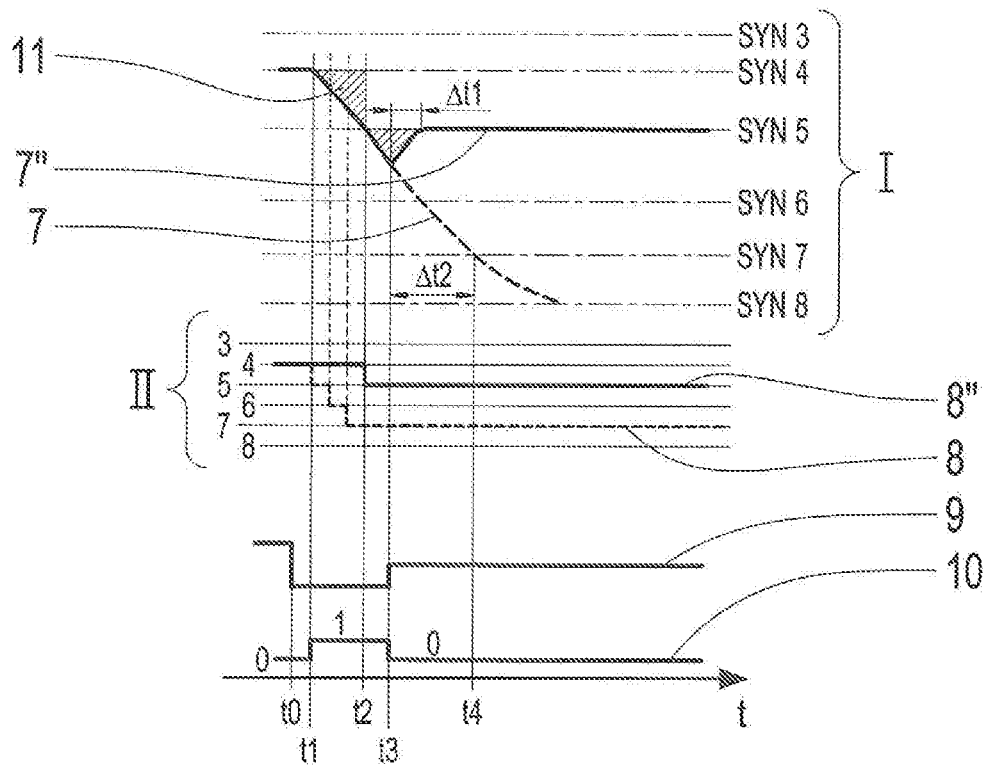
FIG. 4 shows a second timing chart by way of an illustration of the method for operating a motor vehicle in the sailing mode according to the invention.

Details of the first variant of the first embodiment of the invention are described in the following with reference to FIGS. 3 and 4, wherein, in turn, multiple signal curves over time are shown in FIGS. 3 and 4 over the time t, namely a rotational speed curve of the prime mover 1 with the aid of the signal curve 7, signal curves of gear select interlocks in the transmission 2 with the aid of the signal curves 8, 8' and 8", signal curves of an actuation of an accelerator pedal by a driver with the aid of the signal curve 9, and signal curves of a status signal indicating an active or inactive sailing mode with the aid of the signal curve 10, wherein the status 0 corresponds to a sailing mode which is inactive on the control side and the status 1 corresponds to a sailing mode which is active on the control side.

In FIGS. 3 and 4, synchronous speeds SYN3, SYN4, SYN5, SYN6, SYN7 and SYN8 of gears 3 to 8 of the transmission 2 are marked with I, wherein the gears 3 to 8 of the transmission 2 are visualized with II.

In FIG. 3, an actuation of an accelerator pedal by the driver changes at the time t0 according to the signal curve 9, proceeding from an actuated accelerator pedal in the direction toward an unactuated accelerator pedal. Depending on this operating condition of the motor vehicle and depending on at least yet another operating condition of the motor vehicle, a sailing mode for the motor vehicle is activated at the time t1 according to the signal curve 10, wherein, before the time t1, the motor vehicle travels with the gear 4 engaged in the transmission 2 according to the signal curve 8'.

Upon activation of the sailing operating mode at the point in time t1, the tractive force in the transmission 2 is initially interrupted by way of the disengagement of a shift element of the transmission 2 that was previously engaged when the gear 4 was engaged, and therefore shift elements appropriate for the gear 4 are engaged in the transmission 2, as the sailing gear 4, preferably one less shift element than is required for a force-fit connection in the gear 4. As described above, in a sailing gear, in which the motor vehicle sails while the running prime mover 1 is decoupled from the driven end 3, preferably one shift element too few for establishing the force-fit connection in the transmission 2 is engaged.

In contrast to the prior art which is characterized by the signal curve 8, according to the invention, an upshift into higher sailing gears is not immediately implemented. Instead, in FIG. 3, the gear select interlock takes place in the transmission 2 according to the signal curve 8', on the one hand depending on the rotational speed 7 of the prime mover 1, which freely slows down or freely spins down when the prime mover 1 is decoupled from the driven end 3, and depending on the synchronous speeds associated with the next higher sailing gear of the transmission 2 with respect to the particular current sailing gear of the transmission 2. In this way, according to FIG. 3, a shift from the current sailing gear of the transmission 2 into the next higher sailing gear is implemented when the rotational speed 7 of the prime mover 1 falls below or reaches the synchronous speed of the next higher sailing gear of the transmission 2 with respect to the particular sailing gear of the transmission 2.

In this way, FIG. 3 shows that, at the point in time t2, the rotational speed 7 of the prime mover 1 reaches or falls below the synchronous speed SYN5 of the next higher sailing gear 5 with respect to the sailing gear 4 that was engaged before the point in time t2, and therefore, according to the first variant of the embodiment of the invention, a change-over from the sailing gear 4 into the sailing gear 5 takes place in the transmission 2 at the point in time t2. Beginning at the point in time t2, the sailing gear 5 then remains preselected or engaged in the transmission 2 until the rotational speed 7 of the prime mover 1 reaches or falls below the synchronous speed SYN6 of the next higher sailing gear 6 with respect to the current sailing gear 5, at the point in time t3. Only then does a change-over from the sailing gear 5 into the sailing gear 6 take place in the transmission 2, at the point in time t3. Beginning at the point in time t3, the sailing gear 6 remains engaged in the transmission 2 until the rotational speed 7 of the prime mover 1 reaches or falls below the synchronous speed SYN7 of the sailing gear 7 which was previously valid or preselected, and which is next higher with respect to the current sailing gear 6, at the point in time t4, and therefore a change-over from the sailing gear 6 into the sailing gear 7 takes place in the transmission 2 at the point in time t4. This is indicated in the signal curve 8' in FIG. 3, which visualizes this gear select interlock. The gear 8 is not to be utilized for sailing.

Due to this gear select interlock in the active sailing mode while maintaining the sailing mode, an upshift from the sailing gear 4 into the sailing gear 5 in the sailing mode is therefore prevented between the points in time t1 and t2 in FIG. 3, as visualized by the range 11, depending on the rotational speed 7 of the prime mover 1 and depending on the synchronous speed SYN of the next higher gear of the transmission 2 with respect to the particular current sailing gear. The range 12 visualizes a corresponding upshift prevention from the sailing gear 5 into the sailing gear 6 and the range 13 visualizes a corresponding upshift prevention from the sailing gear 6 into the sailing gear 7.

FIG. 3 shows signal curves over time for the first variant of the first embodiment of the invention, in which the sailing operating mode according to the signal curve 10 over the time t remains active after the point in time t1. In contrast, FIG. 4 shows corresponding signal curves over time for the case in which, beginning at the point in time t3, the sailing mode is deactivated or terminated, for example depending on the actuation of the accelerator pedal taking place at the point in time t3.

The signal curves in FIG. 4 correspond to the signal curves in FIG. 3 up to the point in time t3, wherein, in FIG. 3, however, an accelerator pedal is actuated by the driver at the point in time t3 according to the signal curve 9, wherein the sailing mode is deactivated at the point in time t3 according to the signal curve 10. In this case, the gear 5 is preselected or engaged in the transmission 2, as the sailing gear, at the point in time t3 according to FIG. 3.

When the sailing mode is to be terminated at the point in time t3, the exit from the sailing mode always takes place with a positive gradient of the rotational speed 7 of the prime mover 1, as visualized in FIG. 4 by way of the rotational speed curve 7'', due to the gear select interlock 8'' or 8' in the transmission 2 selected according to the first variant of the invention, and therefore, upon termination of the sailing mode at the point in time t3, the rotational speed 7'' of the prime mover 1 must be raised to the synchronous speed SYN5 of the sailing gear 5 currently engaged in the transmission 2, in order to subsequently comfortably build up or establish the force-fit connection in the transmission 2 once this synchronous speed has been reached.

Upon termination of the sailing mode at the point in time t3, it is therefore only necessary to wait for the interval Δt1 until the synchronous speed for the sailing gear adjusted in the transmission 2 at the point in time t3, i.e., the current sailing gear 5, has been reached at the prime mover 1. On the other hand, according to the signal curve 8 according to the prior art, if an upshift into the sailing gear 7 had been implemented immediately after activation of the sailing mode, it would have been necessary to wait for the interval Δt2 before the rotational speed 7 of the prime mover 1 would have reached the appropriate synchronous speed. With the first variant of the first embodiment of the invention, it is therefore possible to realize the difference between the interval Δt2 and the interval Δt1 as a gain of time.

As compared to the prior art, the first variant of the first embodiment of the invention therefore makes it possible to more rapidly provide the synchronous condition for the sailing gear currently adjusted in the transmission, and therefore the prime mover 1 can be more rapidly and comfortably coupled to the driven end 3 upon termination or deactivation of the sailing mode.

According to the first variant of the first embodiment of the invention described with reference to FIGS. 3 and 4, according to which the gear select interlock is implemented in the transmission 2 when the sailing mode is active—depending on the rotational speed 7 of the prime mover 1 and depending on the synchronous speed SYN of the next higher gear or sailing gear of the transmission 2 with respect to the particular current sailing gear—such that a change-over to the next higher sailing gear of the transmission always takes place when the rotational speed of the prime mover 1 falls below or reaches the synchronous speed of the next higher gear or sailing gear with respect to the particular current sailing gear, the exit from the sailing function therefore always takes place with a positive gradient of the rotational speed of the prime mover 1.

According to a second variant of the first embodiment of the invention, the gear select interlock takes place in the transmission 2, depending not only on the rotational speed 7 of the prime mover 1 and depending on the synchronous speed of the next higher gear or sailing gear of the transmission 2 with respect to the particular current sailing gear of the transmission, but rather additionally depending on the slowing or spin-down gradient of the rotational speed 7 of the prime mover 1, which is known on the control side. According to this second variant of the first embodiment of the invention, an actual time is determined depending on the slowing or spin-down gradient of the rotational speed 7 of the prime mover 1, in which the rotational speed 7 of the prime mover 1 falls below or reaches the synchronous speed SYN of the next higher gear or sailing gear with respect to the particular current sailing gear of the transmission 1. An applicable target time or maximum time is predefined on the control side for this time. When the actual time becomes less than the predefined, applicable target time or reaches this target time, then, according to the second variant of the first embodiment of the invention, a shift from the current sailing gear into the next higher sailing gear of the transmission is implemented. This means, according to the second variant of the first embodiment of the invention, a shift into the next higher sailing gear is implemented sooner than is the case in the first variant, which is described with reference to FIGS. 3 and 4, namely sooner by the applicable target time. This can also be interpreted to mean that this target time is applied with zero seconds in the first variant of the first embodiment of the invention described with reference to FIGS. 3 and 4.

According to the second variant of the first embodiment of the invention, the maximum time for the rotational speed of the prime mover to spin down to the synchronous speed of the next higher gear or sailing gear with respect to the particular current sailing gear is predefined and a change-over into the next higher gear or sailing gear is first implemented when the synchronous speed can be reached within this maximum time with the slowing gradient of the rotational speed of the prime mover.

According to a third variant of the first embodiment, the gear select interlock takes place in the transmission 2, when the sailing mode is active, depending on the rotational speed 7 of the prime mover 1, depending on the slowing or spin-down gradient of the rotational speed 7 of the prime mover 1, depending on a run-up gradient of the rotational speed 7 of the prime mover 1, and depending on the synchronous speeds of the current sailing gear and of the next higher gear or sailing gear of the transmission 2 with respect to the current sailing gear. According to this third variant, a first actual time is determined depending on the slowing or spin-down gradient of the rotational speed 7 of the prime mover 1, in which the rotational speed 7 of the prime mover 1 falls below or reaches the synchronous speed of the next higher gear of the transmission 2 with respect to the particular current sailing gear with the prime mover 1 decoupled from the driven end 3. In addition, a second actual time is determined depending on a run-up gradient of the rotational speed 7 of the prime mover 1, which is known on the control side, in which the rotational speed 7 of the prime mover 1 exceeds or reaches the synchronous speed of the particular current sailing gear. A shift from the current sailing gear into the next higher sailing gear of the transmission is then implemented when the first actual time becomes less than the second actual time or the first actual time becomes equal to the second actual time.

According to the third variant of the first embodiment of the invention, a shift into the next higher sailing gear is therefore implemented when the time required to reach the synchronous speed in the next higher sailing gear is shorter or becomes shorter than the time required to reach the synchronous speed in the current sailing gear by a positive gradient of the rotational speed of the prime mover 1.

According to a second embodiment of the invention, it is provided that the gear select interlock is implemented in the transmission 2, when the sailing mode is active, depending on the rotational speed of the prime mover 1 and depending on the synchronous speed of the particular current sailing gear in the transmission. In this way, a gear select interlock from the current sailing gear into the next higher sailing gear is implemented and a shift from the current sailing gear into the next higher sailing gear is implemented when the rotational speed of the prime mover 1 falls below or reaches the synchronous speed of the current sailing gear of the transmission 2. In this embodiment of the invention, the changeover from the current sailing gear into the next higher sailing gear therefore takes place at the earliest point in time.

As a result, a falling gradient of the rotational speed of the prime mover always forms upon deactivation of the sailing mode and, therefore, upon exiting the sailing mode, whereas, in the first variant of the first embodiment of the invention described with reference to FIGS. 3 and 4, an exit from the sailing function always results in a positive gradient of the rotational speed of the prime mover.

In all variants of the invention, upshifts of the gear select interlock into the particular next sailing gear have a time delay with respect to the approach known from practical experience. While this delay is longest in the first variant of the first embodiment of the invention according to FIGS. 3 and 4, this delay is the shortest according to the second embodiment of the invention. In the second variant and the third variant of the first embodiment of the invention, the particular delay lies between these two extreme values.

The gear select interlock according to the invention becomes active after entry into the sailing operating mode of the motor vehicle. The gear select interlock according to the invention is terminated when, in the active sailing mode, either an exit from the sailing mode is demanded or when the highest sailing gear demanded in the sailing mode has been reached, namely the gear 7 in the exemplary embodiment shown.

Furthermore, it can be provided that an upshift prevention forming according to the invention in the gear select interlock in the transmission 2 when the sailing mode is active is limited to a maximum time period. If this maximum time period is reached, an upshift into the next higher sailing gear is therefore implemented even when the aforementioned conditions have not been met on the control side.

The method according to the invention is implemented by the transmission control device 6. The transmission control device 6 therefore implements the above-described gear select interlock in the transmission 2, when the sailing mode is active, depending on a rotational speed of the prime mover 1 and depending on synchronous speeds of the gears of the transmission 2, while maintaining the sailing mode.

Modifications and variations can be made to the embodiments illustrated or described herein without departing from the scope and spirit of the invention as set forth in the appended claims.

REFERENCE CHARACTERS 1 drive train
2 prime mover
3 transmission
4 driven end
5 engine control device
6 transmission control device
7 rotational speed
8 gear select interlock
9 accelerator pedal actuation
10 sailing mode status signal

The invention claimed is:

1. A method for operating a motor vehicle, the motor vehicle comprising a prime mover (1), a transmission (2), and a driven end (3), the transmission (2) being an automatic or automated transmission and connected between the prime mover (1) and the driven end (3), the method comprising:
   activating a sailing mode of the motor vehicle depending on at least one operating condition of the motor vehicle;
   when the sailing mode is active, changing a current sailing gear in the transmission (2) by implementing a gear select interlock in the transmission (2); and
   deactivating the sailing mode depending on one or more operating conditions of the motor vehicle,
   wherein the gear select interlock is implemented in the transmission (2) depending on a rotational speed of the prime mover (1) and depending on synchronous speeds of sailing gears of the transmission (2).

2. The method as claimed in claim 1, wherein the gear select interlock is implemented in the transmission (2) depending on one or both of:
   the synchronous speed of the current sailing gear of the transmission (2); and
   the synchronous speed of a next higher sailing gear of the transmission (2) with respect to the current sailing gear of the transmission (2).

3. The method as claimed in claim 2, wherein the gear select interlock is implemented in the transmission (2) depending on the synchronous speed of the current sailing gear of the transmission (2) and a run-up gradient of the rotational speed of the prime mover (1).

4. The method as claimed in claim 3, further comprising:
   determining a first actual time depending on a slowing gradient of the rotational speed of the prime mover (1), the rotational speed of the prime mover (1) falling below or reaching the synchronous speed of the next higher sailing gear of the transmission (2) with respect to the current sailing gear of the transmission (2) in the first actual time; and determining a second actual time depending on the run-up gradient of the rotational speed of the prime mover (1), the rotational speed of the prime mover (1) exceeding or reaching the synchronous speed of the current sailing gear of the transmission (2) in the second actual time, wherein the gear select interlock takes place in the transmission (2) such that a shift from the current sailing gear into the next higher sailing gear of the transmission (2) is implemented when the first actual time becomes less than or becomes equal to the second actual time during the gear select interlock.

5. The method as claimed in claim 1, wherein the gear select interlock is implemented in the transmission (2) at least depending on the synchronous speed of a next higher sailing gear of the transmission (2) with respect to the current sailing gear of the transmission (2).

6. The method as claimed in claim 5, wherein the gear select interlock takes place in the transmission (2) such that a shift from the current sailing gear into the next higher sailing gear of the transmission (2) is implemented when the rotational speed of the prime mover (1) falls below or reaches the synchronous speed of the next higher sailing gear of the transmission (2) with respect to the current sailing gear of the transmission (2).

7. The method as claimed in claim 5, wherein the gear select interlock is further implemented in the transmission (2) depending on a slowing gradient of the rotational speed of the prime mover (1).

8. The method as claimed in claim 7, further comprising determining an actual time depending on the slowing gradient of the rotational speed of the prime mover (1), the rotational speed of the prime mover (2) falling below or reaching the synchronous speed of the next higher sailing gear of the transmission (2) with respect to the current sailing gear of the transmission in the actual time, wherein the shift from the current sailing gear into the next higher sailing gear of the transmission (2) is implemented when the actual time becomes less than a predefined, applicable target time.

9. The method as claimed in claim 1, wherein the gear select interlock is implemented in the transmission (2) at least depending on the synchronous speed of the current sailing gear of the transmission (2).

10. The method as claimed in claim 9, wherein the gear select interlock takes place in the transmission (2) such that a shift from the current sailing gear into a next higher sailing gear of the transmission (2) is implemented when the rotational speed of the prime mover (1) falls below or reaches the synchronous speed of the current sailing gear of the transmission (2).

11. A control device (6) for operating the transmission (2) of the motor vehicle, wherein the control device (6) is configured to operate the transmission (2) according to the method of claim 1.

12. A control device (6) for operating a transmission (2) of a motor vehicle, wherein:

the control device (6) activates a sailing mode depending on at least one operating condition of the motor vehicle;

the control device (6) performs a gear select interlock in the transmission (2), while maintaining the sailing mode, when the sailing mode is active, depending on a rotational speed of a prime mover (1) and depending on synchronous speeds of sailing gears of the transmission (2); and the control device (6) subsequently deactivates the sailing mode depending on one or more operating conditions of the motor vehicle.

\* \* \* \* \*